United States Patent [19]
Miller

[11] 3,890,740
[45] June 24, 1975

[54] FRUIT BUD RETARDING METHOD AND SYSTEM

[75] Inventor: Gary E. Miller, Salt Lake City, Utah

[73] Assignee: Technical Materials, Limited, Salt Lake City, Utah

[22] Filed: May 7, 1973

[21] Appl. No.: 357,574

[52] U.S. Cl............................................ 47/58; 47/2
[51] Int. Cl............................................. A01g 15/00
[58] Field of Search............................... 47/1–2, 24, 47/58

[56] References Cited
UNITED STATES PATENTS

| | | | |
|---|---|---|---|
| 42,176 | 4/1864 | Fisher | 47/58 |
| 1,442,367 | 1/1923 | Stevens | 47/58 X |
| 1,688,802 | 10/1928 | Crowhurst | 47/2 |
| 1,758,941 | 5/1930 | Gibson | 47/2 X |
| 2,122,734 | 7/1938 | Winford | 47/24 |
| 2,350,621 | 6/1944 | Kasser | 47/2 |
| 3,200,539 | 8/1965 | Kelly | 47/1 |

*Primary Examiner*—Robert E. Bagwill
*Attorney, Agent, or Firm*—Cushman, Darby & Cushman

[57] ABSTRACT

A method of and system for retarding fruit budding whereby a cooling fluid is circulated around the trunks of trees to maintain the interior temperature below 38° F and to control tree hydration and bud development. Coolant circulation is regulated to maintain an internal water stress sufficient to delay tree development but not severe enough to induce adverse physiological effects. Interior trunk temperature and water potential are monitored and serve as indices for coolant regulation.

13 Claims, 4 Drawing Figures

FRUIT BUD RETARDING METHOD AND SYSTEM

The invention relates to a system and method for retarding budding of fruit trees to minimize fruit bud and tree damage caused by cold temperature.

It has been estimated that 15 to 20% of the national fruit crop each year is lost because of spring frost. In many sections of the country, the loss has been much higher. For example, Utah growers have lost an average of 25% of their fruit crop during the past two decades. Once fruit buds begin to swell they are extremely vulnerable to spring frost.

For many deciduous fruit growing areas, delaying bud development for as little as two weeks would drastically reduce losses. For example, for the Utah fruit growing areas, a delay of 2 weeks in budding would have prevented the severe damage to the fruit crop in 6 of the past 10 years that the crop has frozen. A 2 week spring delay would not alter the harvest date of the fruit by more than a couple of days since the long hot summer days are much more significant in fruit development than a few cooler spring days. [1]

[1] Richardson, E. Arlo, "Trends in Utah Climate and Their Potential Relationship to the States Food Industry," *Proceedings of Utah State Horticultural Society*, 1973.

Growers have tried a number of different techniques of protecting fruit from frost. One traditional technique which has been used for decades is heating orchards by burning tires, oil or other materials in open pots or the like. However, increased concern with air pollution and shortage of energy supplies has curbed the use of burners in most states. Further, the use of burners is extremely expensive and often ineffective. A grower using 50 heaters per acre can raise the temperature of the orchard about 5°F if the wind is not more than 5 miles per hour. In order to avoid frost damage, growers normally need to maintain the temperature for most types of trees at about 28° F or above just after budding. Thus, if the ambient air temperature drops below 23° F or if the wind exceeds 5 miles per hour, the crop may likely be lost despite expensive heating efforts.

Fruit buds have also been saved by spraying water on trees during freezing temperatures. As the water freezes on the branches, it releases heat which prevents the bark temperature from going below 31.5° F. There are a number of problems associated with this technique. A grower needs a source of water usually before canal water is available in the spring. The breakage of limbs which often occurs as a result of the weight of the ice can itself damage the trees and harm the fruit crop.

Another technique which has been tried with some success is the use of wind machines mounted 20 to 30 feet in the air with large propellers to mix the air. If there is an inversion layer of warm air above the orchard, due to a radiative freeze, mixing the warm air with the cold air below it may save the crop. Of course, on clear, cold nights of advective freezes when the air at different heights has no difference in temperature, the mixing of cold air with other cold air is useless. In many deciduous fruit growing areas, advective freezes cause most of the damage.

Some attempts have been made to cover fruit trees with fog or foam to reduce radiation loss of heat from the soil or plants. While this has met with some success, with low growing plants such as strawberries, it is difficult to provide sufficient material at the height of fruit trees. Suggestions have been made and experiments are proceeding to apply whitewash, waxes and oils to the trees to reflect heat. Some have proposed injecting chemicals such as antifreeze and cryoprotectant to protect the buds.

None of these techniques is satisfactory. It is obvious that some technique is required to retard fruit budding rather than trying to increase orchard temperature during a frost after budding has occurred.

The mechanism by which budding occurs in the spring in fruit trees is not completely understood. It is believed that hormones such as cytokinins are produced in the roots and are translocated on the upper portion of the tree through the xylem during the spring when a large amount of water is flowing upward. Accordingly, if the flow of tree fluids from the roots after the winter rest period into the branches can be slowed, budding can be retarded.

The U.S. Pat. No. given to Stevens (1,442,367), which was issued in 1923, describes a technique for retarding the flow of sap and preventing injury by late frost to fruit and other trees in which a portion of the tree trunk is cooled by circulating a cooling medium through a jacket wrapped around the trunk. It is stated that the apparatus may also be used for irrigation purposes in the spring.

The applicant of this application has discovered, through extensive experimentation, that simply circulating a brine solution in the fashion described by Stevens will not effectively retard fruit budding without damage to the tree. Control of moisture stress (i.e. water potential) is critical and is regulated by maintaining the tree trunk at the proper temperature for controlled time intervals.

In the applicant's method of retarding bud development, moisture stress of the tree is measured periodically to insure that the buds do not die because of desiccation. The cold treatment around the trunk is altered depending upon the measured moisture stress to prevent tree damage. If the cooling is not applied at the proper temperature and for controlled time intervals, the moisture stress will either not rise to level high enough to delay budding or the moisture stress will rise so high as to cause bud kill, crop loss, and possible tree loss.

It has been discovered that the temperature within the tree must be maintained below 38° F for any substantial delay in bud growth to result. It further appears that no benefit is obtained from reducing the temperature of the interior of the tree below 30° F.

The moisture stress (i.e. water potential) of the tree is at least periodically measured by any of a number of techniques now in use. In the technique used by the applicant, a branch is placed in a pressure bomb apparatus and the amount of pressure required to cause moisture to appear on the cut surface of the branch noted and related to moisture stress. Richard H. Waring and Brian D. Cleary describe how the pressure bomb measures moisture stress in their article "Plant Moisture Stress: Evaluation by Pressure Bomb," printed in the Mar. 10, 1967 issue of *Science*. Electrical conductivity of tree tissue can also be used to determine moisture stress though this method is not as reliable as the pressure bomb. Other techniques for measurement of moisture stress such as the "Dye Method" or "Psychrometer Method" are described in Bulletin 484, "Measurement of Plant and Soil Water Status" published May, 1971, by the Utah Agricultural Experiment station.

An anti-transpirant such as WILTPROOF (trademark) can be used to protect the tree from desiccation. the anti-transpirant can be applied to the tree prior to the first warm up of spring to act as a barrier to prevent moisture escape from the surface of the tree branches, and thus keep the moisture stress at a low level.

According to the system of this invention, a number of trees defining an orchard or a portion of an orchard each have a protective jacket for circulating cooling fluid disposed about it and held in place by any suitable means. Coils or the like may be provided in conjunction with each jacket and a number of trees can be serially connected so that the circulating fluid flows around the trunk of each sequentially. These coils may be further connected to a fluid reservoir which is supplied with cooling fluid, for example, brine at 30° F, with a pump provided to circulate the cooling fluid. Preferably the brine in the reservoir tank would be cooled by coils through which circulate brine from a primary tank. The brine temperature in the primary tank would be, for example, at −30° F.

As mentioned above, moisture stress is controlled by periodically allowing the trees to warm up and hydrate. Uniform warming of all trees is accomplished by circulating a heated fluid through the coils around the tree. If the cooling is simply shut off and the trees allowed to thaw at a rate dependent on ambiant air temperature the trees will not all warm up at the same rate. The result of non-uniform warming will be that some trees will hydrate more than others and can possibly pick up enough moisture so that additional cold treatment is essentially ineffective in delaying further bud growth.

Further, the system can be provided with additional lines coupled to the lines supplying cooling fluid to the tree jackets by an appropriate valve so that the system can be used after danger of spring frost has passed, for trickle irrigation.

Many other objects and purposes of the invention will be clear from the following detailed description of the drawings.

DETAILED DESCRIPTION OF DRAWINGS

Figure 1:
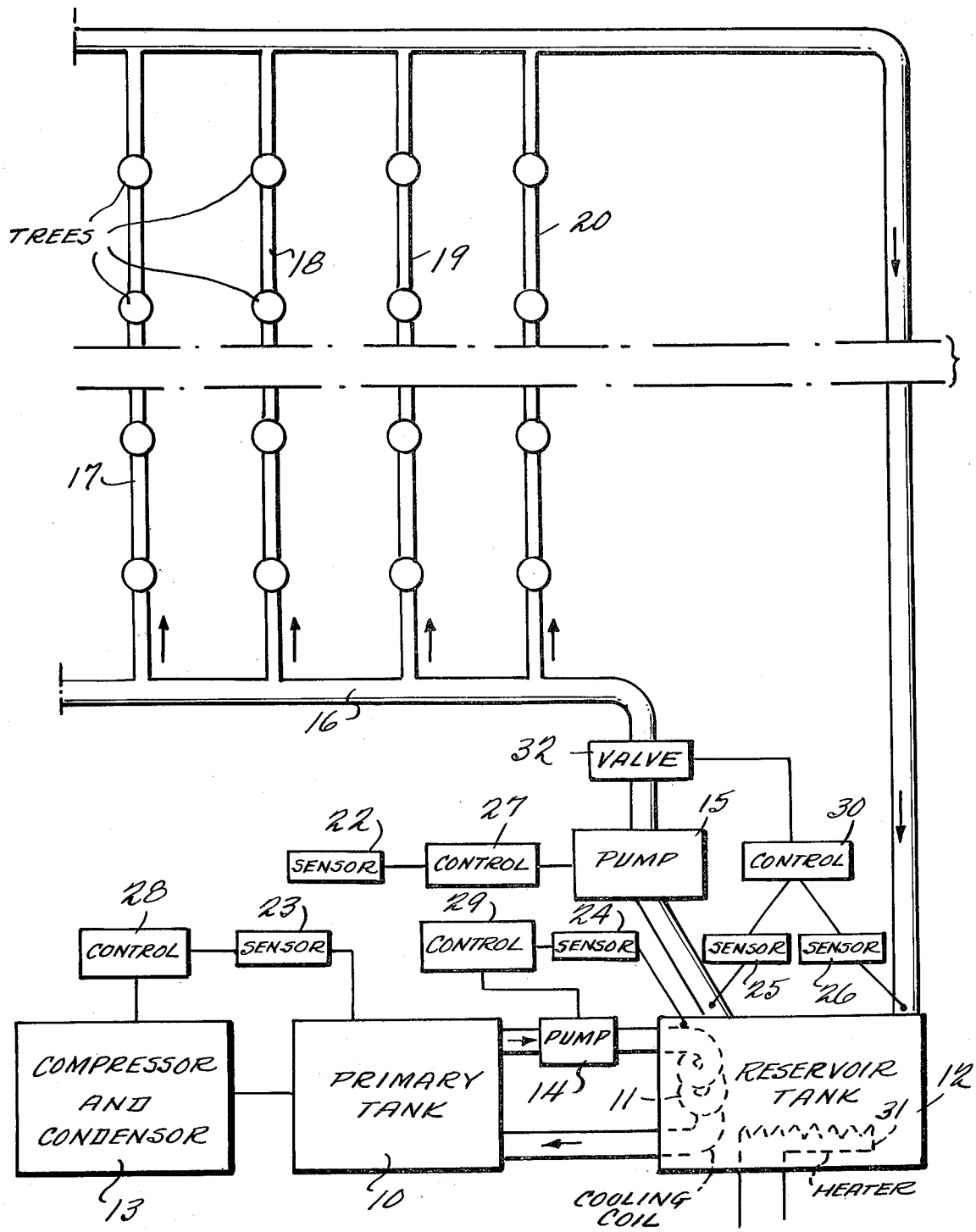
FIG. 1 illustrates a block diagram of the unique system of this invention for retarding fruit tree budding.

Reference is now made to FIG. 1 which illustrates in block diagram one system according to this invention for retarding fruit tree budding effectively and without any damage to the trees. The system illustrated in block diagram in FIG. 1 circulates a cooling fluid, for example, salt water brine, at a temperature of −30°F from a primary tank 10 through coil 11 in a reservoir tank 12 so that brine in reservoir tank 12 is maintained at a preset temperature, for example 30° F. The brine in primary tank 10 is cooled by a conventional compressor and condensor 13 which supplies cooling fluid through coils in the primary tank 10. The brine is circulated from the primary tank 10 by pump 14. The brine in reservoir tank 12 is circulated by a pump 15 to flow through a main line 16 and from main line 16 through each of a plurality of branch lines, including branch lines 17, 18, 19 and 20. Each of the branch lines circulates their fluid around the trunks of a number of trees. The cooling fluid returns to the reservoir tank 12 via a return line 21.

Figure 2:
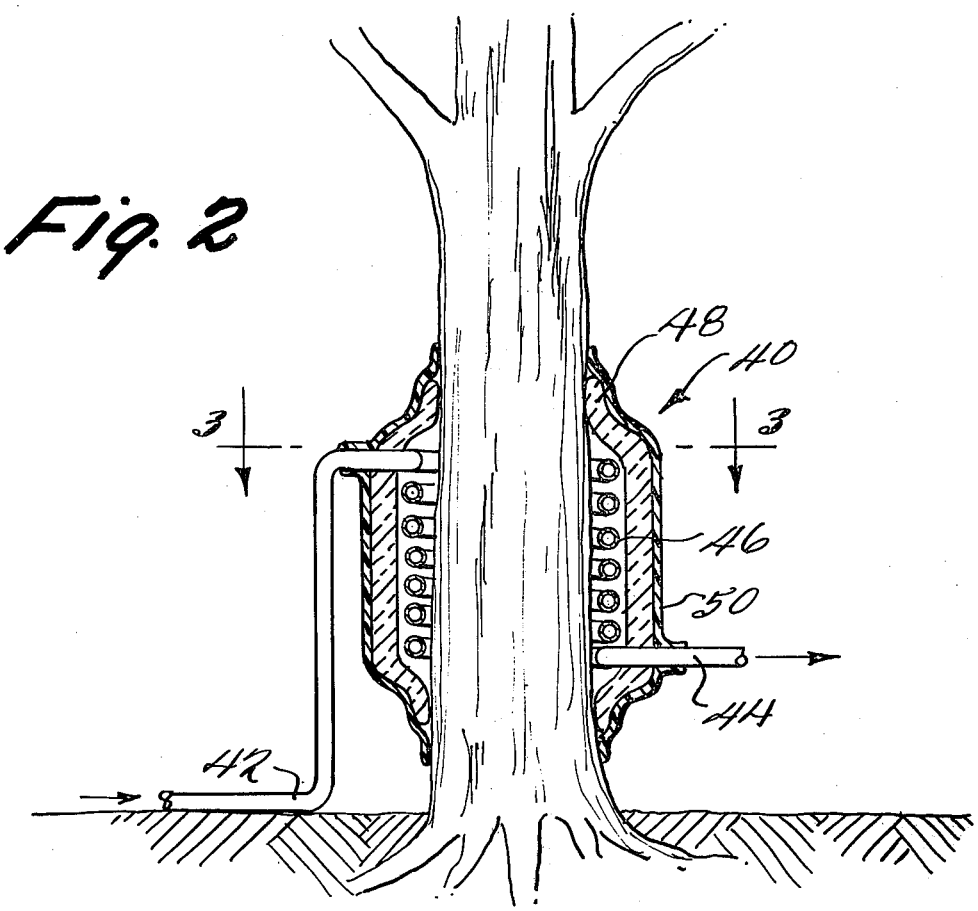
FIG. 2 illustrates a cut-away view of a cooling jacket disposed about a fruit tree.
Figure 3:
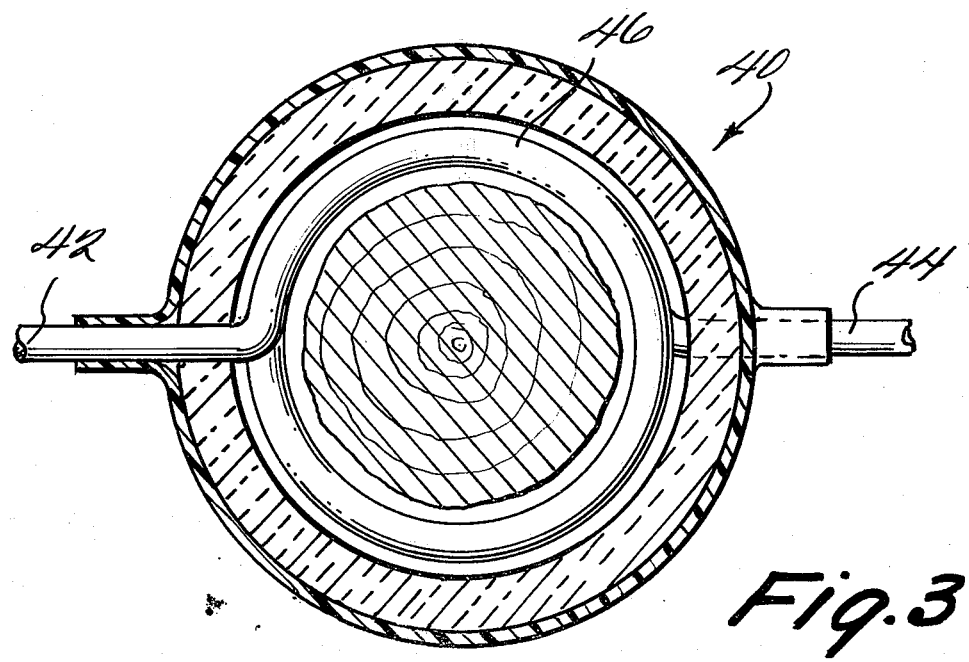
FIG. 3 shows an enlarged cross section of the jacket on line 3—3 of FIG. 2.

As shown in FIGS. 2 and 3, a jacket 40 is wrapped about the trunks of each of the trees with cooling fluid entering jacket 40 via line 42 and leaving via line 44. Within jacket 40 the fluid circulates about the trunk through a conventional plastic, metal or other coil 46. Any suitable type of container which allows the cooling medium to flow around the tree can be used.

In the embodiment of FIG. 2, an insulating sheet 48 such as fiberglass, urathane foam or styrofoam surrounds coil 46. A moisture barrier 50 such as polyethylene sheet, surrounds the insulation to minimize the amount of moisture absorbed by the insulation.

The system is turned on in the spring at the first sign of warm weather (normally when maximum ambiant temperature reaches 40° F) and after the trees have completed their winter rest period.

Again, referring to FIGS. 1 and 2 and as mentioned briefly above, the ambiant temperature, the temperature of primary tank 10 and the temperature of reservoir tank 12 are continuously monitored by conventional sensors 22, 23, 24 and 25. Such sensors may comprise a thermoresistor or the like. The signals produced by sensors 22, 23, 24, 25 and 26 are applied to simple control logics 27, 28, 29 and 30 which in turn control the temperatures in tanks 10 and 12 and the amount of fluid circulating around the trees. Sensor 22 measures ambiant air temperature and will cause pump 15 to shut off when the ambiant temperature drops below a predetermined level, for example, 30°F., and turn on when the temperature exceeds a predetermined level, for example 32°F. Sensor 23 measures the brine temperature in primary tank 10 and causes the compressor to maintain the brine at a predetermined temperature, for example, −30°F. Sensor 24 measures the brine temperature in reservoir tank 12 and causes pump 14 to circulate fluid from primary tank 10 through coils 11 in reservoir tank 12 so that the quantity of fluid circulated is a function of reservoir tank 12 temperature. The reservoir tank 12 temperature is maintained at a predetermined level, for example 30° F.

When ambient air temperature exceeds 32° F, pump 15 circulates brine from reservoir tank 22 continuously around the trees. The trunk temperature within the coil around the trees is maintained at a predetermined level, for example 30° F. At this temperature it is believed that a viscous block forms at the trunk which slows the rise of fluid to the branches. Reducing the temperature below 30° F does not, it is believed, accomplish any further blockage and only increases refrigeration costs. The blocking of the rise in tree fluids results in dehydration of the tree and a corresponding increase in moisture stress. When the moisture increases to a level slightly less than what would cause tree damage, the tree temperature is increased to allow the flow of tree fluid. Pump 14 is shut off and temperature in reservoir tank 12 is increased via heaters 31 to a level sufficient to provide the desired rate of tree hydration. As the tree hydrates, the moisture stress will decrease. Moisture stress measurements are taken at regular intervals as the tree hydrates. When the moisture stress has decreased to a predetermined level, the tree temperature is again decreased to prevent further hydration.

The system components are sized and designed so that the temperature difference between the brine exit temperature from primary tank 10 and the brine return temperature is less than a predetermined amount, for example 2° F, on a maximum temperature day, for example 75° F.

The rate at which fluid is circulated around the trees is controlled through the use of sensors 25 and 26 that measure the exit and return temperature of the brine in reservoir tank 12. The signals from sensors 25 and 26 are transmitted to a control logic 30 that in turn controls valve 32 so that the fluid flow is varied dependent on the differential temperature measured by sensors 25 and 26. The control logic 30 is adjusted so that flow is maximum when the temperature differential is large, for example 2° F, and the flow is low when the temperature differential is small, for example 0.2° F.

According to Paul J. Kramer in his book *Plant and Water Relationships - A Modern Synthesis*, McGraw Hill, 1969, if water potential exceeds 20 bars a plant has moisture stress. However, the level of moisture that will result in damage to a particular plant is a function of its variety and species. Also, the applicant believes the duration of time a plant is maintained at a high moisture stress is also a factor in plant damage.

To conserve moisture content and thus reduce moisture stress, an anti-transpirant, such as WILTPROOF, (trademark) can be used in conjunction with the process. Preferably the anti-transpirant is applied to the tree prior to the first spring warm up to act as a barrier preventing moisture from escaping from the surface of the tree branches.

Figure 4:
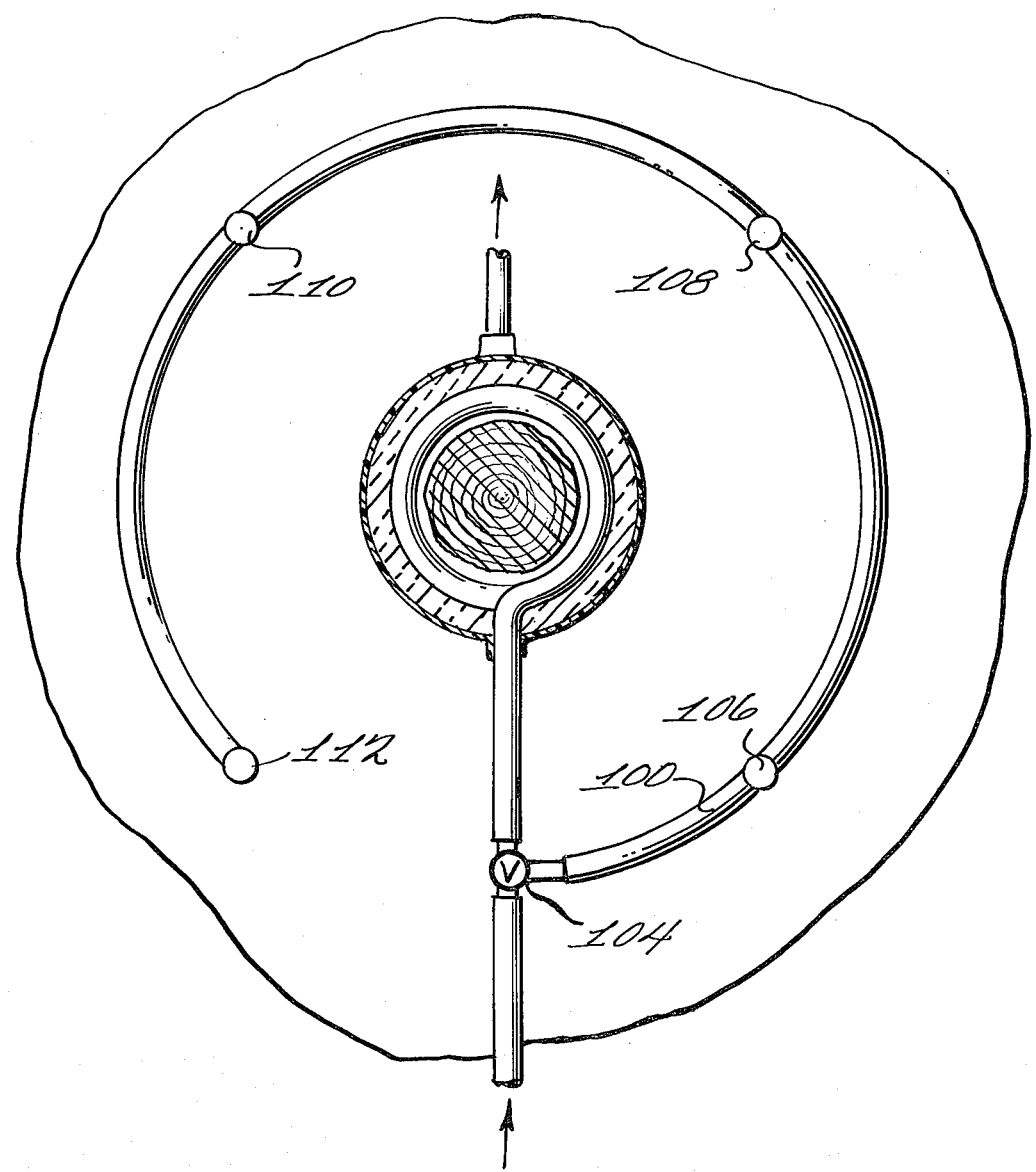
FIG. 4 shows a schematic view of a trickle irrigation line coupled to the line which supplies cooling fluid to the jacket.

Referring now to FIG. 4, the use of the system of this invention for trickle irrigation in the summer is illustrated. A simple trickle irrigator line 100 can be simply connected to the line 102 which connects to the reservoir tank for the system. A valve 104 can be permanently or intermittently affixed in the line for diverting fluid to line 100 and its drippers 106, 108, 110 and 112. The line size necessary for circulating the cooling medium on the trees is compatible with that required for trickle irrigation. Normally, 2-4, 1-10 gallons/hour drippers are required per tree.

After the cooling system is permanently turned off in the summer, the cooling medium which may, for example, be salt brine, can be drained from the system and the system flushed with water. Trickle irrigators are then attached or valved onto the system. In the fall, the trickle irrigators are valved off or removed.

Many changes and modifications in the above described embodiment of the invention can, of course, be carried out without departing from the scope thereof. While the technique and system are primarily useful in preventing frost damage, it may also be useful in delaying harvest and timing fruit growth to minimize insect damage. Also, the system may possibly be used to harden the trees in the fall and thus prevent early fall frost damage. In addition, the system can be used to increase and control the water potential of any tree or other plant of any nature so constructed as to accommodate a cooling coil along some part of the plant between its root system and the part of the plant to be stressed. Accordingly, that scope is intended to be limited only by the scope of the appended claims.

What is claimed is:

1. A method of retarding budding of a fruit tree comprising the steps of:
    maintaining a temperature immediately adjacent and encircling the exterior of the trunk below 38° F substantially independently of ambiant air temperature; and
    intermittently discontinuing maintainence whenever excessive moisture stress exists to permit the temperature to rise above 38° F in order to prevent excessive moisture stress and dehydration and damage to said tree.

2. A method as in claim 1, wherein said step of maintaining includes the step of circulating a cooling fluid about said trunk.

3. A method as in claim 1 further including the step of periodically checking the moisture stress level of the tree above said trunk; and wherein said step of maintaining the temperature includes cooling and wherein said step of discontinuing said cooling when the moisture stress is above a predetermined level and reapplying said cooling when the moisture stress decreases below a predetermined level.

4. A method as in claim 3 wherein said step of checking includes the step of placing a tree branch in a pressure bomb, and measuring the pressure required to cause moisture to the first appear on the cut surface of the branch.

5. A method as in claim 1 wherein said step of maintaining the temperature includes the step of maintaining said temperature between 30° F and 38° F.

6. A method as in claim 1, wherein said step of maintaining includes the step of maintaining at substantially 30° F.

7. A method as in claim 1 including the further step of applying an anti-transpirant to said tree.

8. A method of retarding budding of a plurality of fruit tree comprising the steps of:
    maintaining a temperature immediately adjacent to and encircling the exterior of the trunk below 38° F substantially independently of ambient air temperatures including circulating a cooling fluid about each of a number of trunks sequentially; and
    intermittently permitting said trunk to return to ambient air temperature whenever excessive moisture stress exists so as to prevent dehydration and damage to said tree.

9. A method as in claim 8 wherein said cooling fluid is a cooling brine and said step of circulating includes the step of pumping said cooling brine through a fluid passage disposed about each of said trunks and including the further steps of:
    maintaining a cooling brine in a primary tank at a predetermined temperature; and
    circulating said primary tank brine through said fluid passage via a reservoir tank so as to maintain reservoir tank temperature at a predetermined temperature less than 38° F.

10. A system for retarding fruit tree budding comprising:
    means defining a fluid passage about the trunks of each of a plurality of trees;
    means connecting a number of said defining means in series;
    means for providing a cooling fluid;
    means for heating said cooling fluid;

pump means for circulating said cooling fluid through said defining means;

means for continuously detecting exit and return temperature of the cooling fluid as it circulates through the system;

means for controlling the quantity of cooling fluid circulated as a function of detected temperature differential between cooling fluid exit and return temperature to minimize the energy transmitted to the fluid while maintaining a predetermined tree temperature.

11. A system as in claim 10 wherein said providing means includes a refrigeration compressor and condensor and a primary tank and a reservoir tank.

12. A system as in claim 10 wherein said defining means includes at least a single coil wrapped about said trunk, a cover about said coil, and insulation between said cover and said coil.

13. A system as in claim 10 including a number of trickle irrigation drippers and a valve connecting each said dripper to said connecting means.

* * * * *